Sept. 5, 1967     L. H. SIDELEAU     3,340,370
ANTI-THEFT DEVICE FOR MOTOR VEHICLES
Filed Jan. 10, 1966
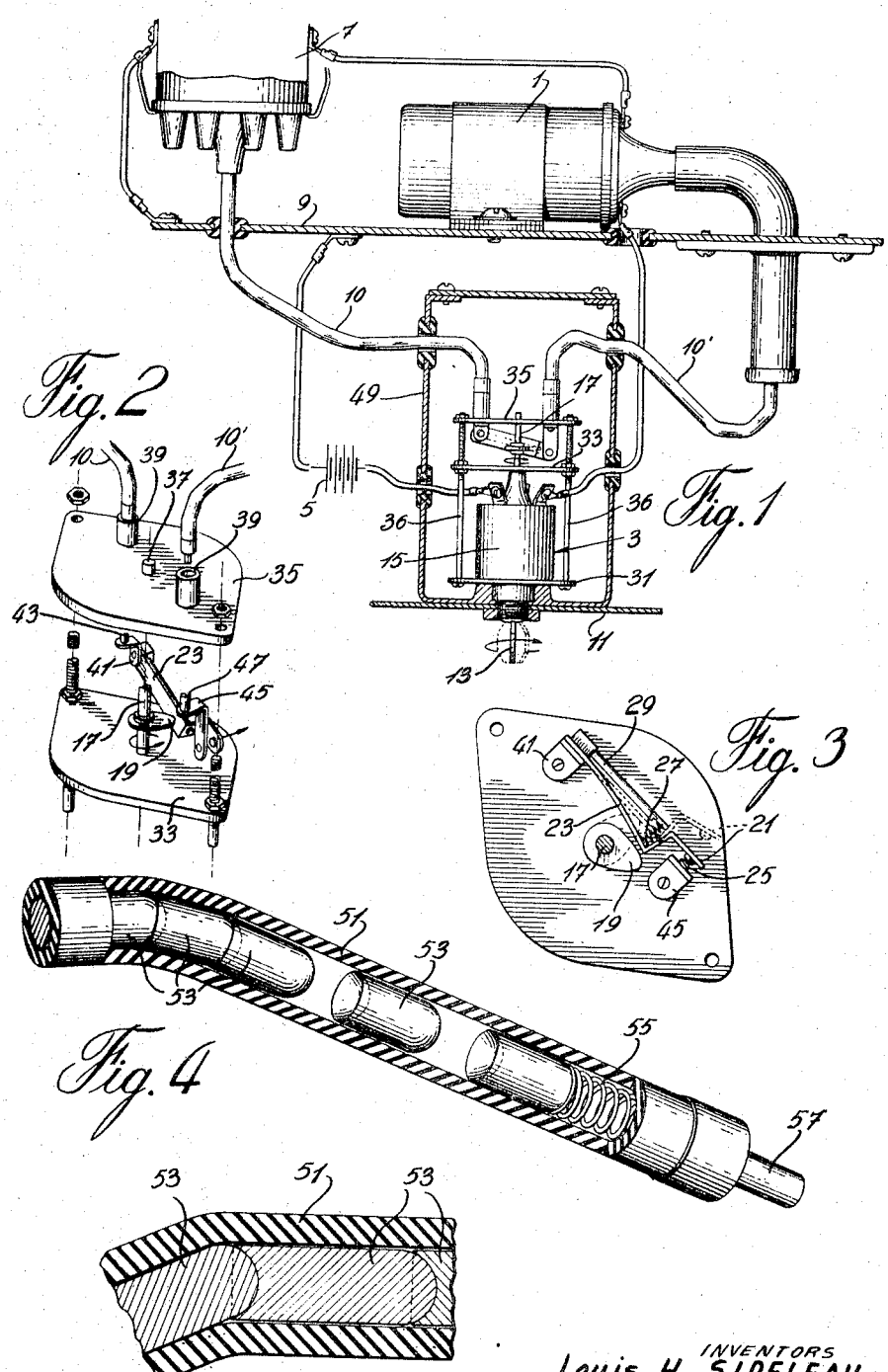
INVENTORS
Louis H. SIDELEAU
BY
ATTORNEYS

United States Patent Office 3,340,370
Patented Sept. 5, 1967

3,340,370
ANTI-THEFT DEVICE FOR MOTOR VEHICLES
Louis H. Sideleau, Coaticook, Stanstead, Quebec, Canada
Filed Jan. 10, 1966, Ser. No. 519,637
2 Claims. (Cl. 200—44)

This invention relates to an anti-theft device for motor vehicles. It is more particularly directed to a dual-action switch which is adapted to cut off all coil activity when the car ignition switch is off.

The standard automobile is equipped with an ignition switch which is adapted to cut off the low-tension side of the ignition coil. In order to start a car when the ignition switch is off and when the key is not available one may resort to the very simple operation of jumping the interruptor switch of the primary circuit. It can easily be realized that the ignition switch affords no real protection against theft. Many attempts have been made to provide the automobile with an efficient and simple device that would prevent accessibility to the electric circuit of the car. The prior art has disclosed alarm devices such as in U.S. 2,620,380, locking switch such as in U.S. 2,802,-198 and even hidden switches as in U.S. 1,459,995. However, to my knowledge, the prior art safety devices are not efficient since they may easily be discovered or dispensed with when somebody wants to steal a car. These devices do not provide a protection which is safe, simple and economical.

I have found that the disadvantages of the prior art devices may be overcome by providing, in a motor vehicle equipped with an ignition switch, an ignition coil, a distributor and a storage battery, an anti-theft device which comprises a coil interruptor so constructed and arranged as to open the high tension circuit of the ignition coil simultaneously with the low tension circuit when the ignition switch is operated to cut-off.

This device makes it possible to provide an efficient cut-off of coil activity by the simple operation of turning off the ignition key.

In a preferred embodiment of the invention, I have provided a high tension cable which, due to its particular construction, makes it impossible even to jump the high tension circuit interruptor switch of my invention.

In the drawings which illustrate an embodiment of my invention.

FIG. 1 is a side elevation view, partly in cross-section of an arrangement of the electrical circuit according to my invention;

FIG. 2 is an exploded view of the high tension interruptor switch according to my invention;

FIG. 3 is a top plan view of the high tension interruptor switch according to my invention;

FIG. 4 is a longitudinal view partly in cross-section of a high tension cable according to my invention;

FIG. 5 is an enlarged cross-sectional view illustrating a bend in the high tension cable according to my invention;

Referring now to FIG. 1, the general conventional system comprises a low voltage circuit consisting of the low voltage branch (not shown) of the coil 1, the ignition switch 3, the storage battery 5 and the rotor part (not shown) of the distributor 7, all these components being connected in series in the usual manner and possibly with the use of a ground connection through the fire wall 9. No further details need be given of this part of the system since it is entirely conventional.

The high voltage circuit comprises the usual high voltage lead connected to the high voltage branch of the coil 1 and the high voltage terminal of the distributor 7, again in the usual manner. This high voltage lead is divided into two portions 10, 10' for connection to the novel combination described hereinafter.

The ignition switch 3 is secured, in known manner, to the dashboard 11 for operation by a conventional ignition key 13. It comprises the usual cylindrical drum 15 and an extension shaft 17 coaxial with drum 15 and adapted to rock back and forth to the same extent as key 13 when the switch is turned on and off.

As best illustrated in FIGS. 2 and 3, a cam 19 is fixedly mounted on shaft 17 for rotation therewith. Cam 19 as will readily be appreciated from FIG. 3, particularly, operates to move one studded end 21 of a flexible arm 23 away from an electrical contact stud 25, arm 23 being normally held thereagainst by means of a compression spring 27 located between a stationary wall 29 and the said arm 23 which for that purpose may have the general Z shape shown in FIG. 3.

It will be understood that various other means can be used to obtain the flexibility of arm 23 and ensure contact between stud 25 and the corresponding stud on the end 21 of arm 23.

The remaining structure is preferably in the form illustrated in FIGS. 1, 2 and 3 which is shown to comprise a support consisting of three spaced plates 31, 33 and 35 interconnected by means of stay bolts 37. Plate 31 is ring-shaped and circumscribes drum 15 whereas plate 33 has a central hole for the guiding of shaft 17, the upper end of which journals in a bearing 37 mounted across plate 35.

Plate 35 is made of electrically insulating material and has a pair of electrically conductive connecting sleeves 39 extending thereacross.

The flexible arm 23 has one end secured to a bracket 41 having a pin 43 adapted to be snugly received at the lower end of one of the sleeves 39. A second bracket 45 also has a pin 47 press fitting into the other sleeve 39. Pins 43, 47, brackets 41, 45 and arm 43 are of course made of electrically conductive material.

It will thus be seen that the aforedescribed cut-off switch and support can easily be mounted over drum 15 of ignition switch 3. The assembly of plates 31, 33 and bolts 36 is first mounted over drum 15 and shaft 17. Then, bracket 41 with flexible arm 23 is fixed to the corresponding sleeve 39 and the second bracket 45 is press fitted into the other sleeve 39. Finally, the latter sub-assembly is secured at the upper ends of bolts 36 and the terminals of the high voltage leads 10, 10' are slipped into the sleeves 39. For that purpose, the said terminals may be provided with pins similar to the previously mentioned pins 43, 47.

The operation of the device will readily be apparent from the drawing and the above description. Indeed, rotation of ignition key 13 from on to off position will cause likewise rotation of cam 19 and movement of flexible arm 23 in a direction to separate electrical contact studs 21 and 25 to break electrical contact therebetween thus cutting off all coil activity.

The device of the invention should preferably be contained in a casing 49 secured to the dashboard 11 of the automobile.

As an additional feature of the invention and to increase safety against tempering with the ignition system, the invention proposes a high voltage cable such as shown in FIGS. 4 and 5. The latter would be made of a combination of a rubber or the like conduit 51 into which are inserted a series of generally cylindrical slugs 53, preferably made of copper for maximum electrical conductivity. Each slug has one rounded end and one concave end to receive the rounded end of the adjacent slug. With this arrangement, and with particular reference to FIG. 5, it will be appreciated that the conduit 51 can be bent relatively easily.

In order to ensure proper contact and good electrical conductivity in the string of slugs, the latter may be pressed against one another by means of a spring 55 at one end thereof having an electrical contact with the terminal pin 57.

Thus any attempt to cut the wire for short circuiting will cause at least partial emptying of conduit 51 and breaking of the cable.

Although a specific embodiment of this invention has been described, it will be understood that various modifications may be made thereto without departing from the spirit of the invention.

I claim:

1. In a motor vehicle which comprises an ignition switch, an ignition coil, a distributor, a storage battery, low tension cables and high tension cables, an anti-theft device which comprises a shaft extension arranged in prolongation of the axis of said ignition switch, said shaft extension being provided with a cam fixedly mounted substantially half-way thereon, said cam being adapted to operate a spring leaf contact constructed and arranged to open the high tension circuit on the high tension cable connecting said ignition coil and said distributor simultaneously as said ignition switch is switched off to cut off the primary circuit, said heavy tension cable consisting of a flexible tube made of an insulating material said tube having metallic connections at both ends thereof and containing therein a string interconnecting generally cylindrical metallic slugs each of said metallic slugs having one rounded end and one convex end, said metallic slugs being held in contact by means of a metallic spring integrally mounted to one of said metallic connections at one end of said tube.

2. A high tension cable consisting of a flexible tube made of an insulating material said tube having metallic connections at both ends thereof and containing therein a strip of interconnecting generally cylindrical metallic slugs each of said metallic slugs having one rounded end and one convex end, said metallic slugs being held in contact by means of a metallic spring integrally mounted to one of said metallic connections at one end of said tube, to cause at least partial emptying of said tube when cutting the same.

References Cited

UNITED STATES PATENTS

| | | | |
|---|---|---|---|
| 450,734 | 4/1891 | Bunker | 174—126 |
| 2,112,064 | 3/1938 | Blume | 200—6 X |
| 2,223,198 | 11/1940 | Zittrich et al. | 174—111 |
| 2,313,549 | 3/1943 | Hornan | 200—44 X |
| 2,387,783 | 10/1945 | Tawney | 174—111 X |
| 2,397,907 | 4/1946 | Akin. | |
| 2,419,053 | 4/1947 | Bennett. | |
| 2,574,290 | 11/1951 | Rowe | 200—76 |
| 2,740,826 | 4/1956 | Bondon | 174—111 X |
| 3,069,523 | 12/1962 | Hart | 200—61.76 X |

FOREIGN PATENTS 167,387  12/1950  Germany.

ROBERT K. SCHAEFER, *Primary Examiner.*

H. HOHAUSER, *Assistant Examiner.*